(12) United States Patent
Hilt et al.

(10) Patent No.: US 8,539,099 B2
(45) Date of Patent: Sep. 17, 2013

(54) METHOD FOR PROVIDING ON-PATH CONTENT DISTRIBUTION

(75) Inventors: Volker Hilt, Middletown, NJ (US); Ivica Rimac, Tinton Falls, NJ (US); Suman Srinivasan, New York, NY (US); Moritz Steiner, Red Bank, NJ (US)

(73) Assignee: Alcatel Lucent, Paris (FR)

( * ) Notice: Subject to any disclaimer, the term of this patent is extended or adjusted under 35 U.S.C. 154(b) by 494 days.

(21) Appl. No.: 12/654,907

(22) Filed: Jan. 8, 2010

(65) Prior Publication Data
US 2011/0173248 A1 Jul. 14, 2011

(51) Int. Cl.
*G06F 15/173* (2006.01)
(52) U.S. Cl.
USPC ............ 709/238; 709/217; 709/228; 709/245
(58) Field of Classification Search
USPC .................. 709/217, 228, 238, 245
See application file for complete search history.

(56) References Cited

U.S. PATENT DOCUMENTS

| | | | |
|---|---|---|---|
| 7,162,539 B2 * | 1/2007 | Garcie-Luna-Aceves | 709/242 |
| 7,254,626 B1 * | 8/2007 | Kommula et al. | 709/223 |
| 7,725,596 B2 * | 5/2010 | Garcia-Luna-Aceves et al. | 709/238 |
| 7,852,767 B2 * | 12/2010 | Twiss | 370/235 |
| 7,953,869 B2 * | 5/2011 | Demmer et al. | 709/228 |
| 2002/0029287 A1 * | 3/2002 | Yemini et al. | 709/238 |
| 2002/0091855 A1 * | 7/2002 | Yemini et al. | 709/238 |
| 2003/0079027 A1 * | 4/2003 | Slocombe et al. | 709/229 |
| 2004/0073596 A1 * | 4/2004 | Kloninger et al. | 709/200 |
| 2004/0073707 A1 * | 4/2004 | Dillon | 709/245 |
| 2008/0235400 A1 * | 9/2008 | Slocombe et al. | 709/245 |
| 2008/0320154 A1 * | 12/2008 | Demmer et al. | 709/229 |
| 2009/0182843 A1 * | 7/2009 | Hluchyj et al. | 709/219 |
| 2010/0293296 A1 * | 11/2010 | Hsu et al. | 709/245 |
| 2011/0173248 A1 * | 7/2011 | Hilt et al. | 709/203 |

* cited by examiner

*Primary Examiner* — Michael Won
(74) *Attorney, Agent, or Firm* — Harness, Dickey & Pierce

(57) ABSTRACT

In one embodiment, the method includes receiving a content request from the end user at a proxy. A modified TCP connection request message is generated such that the modified TCP connection request message includes a content identifier. The content identifier identifies the requested content. The modified TCP connection request message is sent from the proxy towards an origin server associated with the requested content, and a response to the TCP connection request message is received from a network element. A TCP connection is established with the network element.

3 Claims, 10 Drawing Sheets

METHOD FOR PROVIDING ON-PATH CONTENT DISTRIBUTION

This invention was made with Government support under Grant No, CNS-0831734 awarded by the National Science Foundation. The Government has certain rights in this invention.

BACKGROUND OF THE INVENTION

1. Field

Example embodiments of the present invention relate generally to content distribution networks.

2. Related Art

Content distribution networks (CDNs) provide access to content for end users. In order to enable content, including information objects, for example, video, audio files, web sites, etc, to be served from network nodes that are closer to the end user, CDN's perform various levels of indirection, such as DNS or HTTP redirection. These solutions have inefficiencies and introduce delay in delivering content.

Research has been conducted in the area of on-path solutions for content distribution. However, conventional on-path solutions require fundamental changes to currently used network application program interfaces (APIs).

SUMMARY OF THE INVENTION

One or more embodiments refer to a method of handling a content request from an end user for content located on a network includes receiving a content request from the end user at a proxy.

In one embodiment, the method includes receiving a content request from the end user at a proxy. A modified TCP connection request message is generated such that the modified TCP connection request message includes a content identifier. The content identifier identifies the requested content. The modified TCP connection request message is sent from the proxy towards an origin server associated with the requested content, and a response to the TCP connection request message is received from a network element. A TCP connection is established between the proxy and the network element.

According to another embodiment, a method of providing content requested from a network includes receiving at a caching router a modified TCP connection request message. The modified TCP connection request message originates at a proxy. The modified TCP connection request message includes a content identifier. The content identifier identifies content requested by an end user. The content identifier is checked at the caching router. The caching router determines whether the caching router contains the requested content identified by the content identifier. A TCP connection is established between the caching router and the proxy, if the caching router contains the requested content identified by the content identifier.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1:
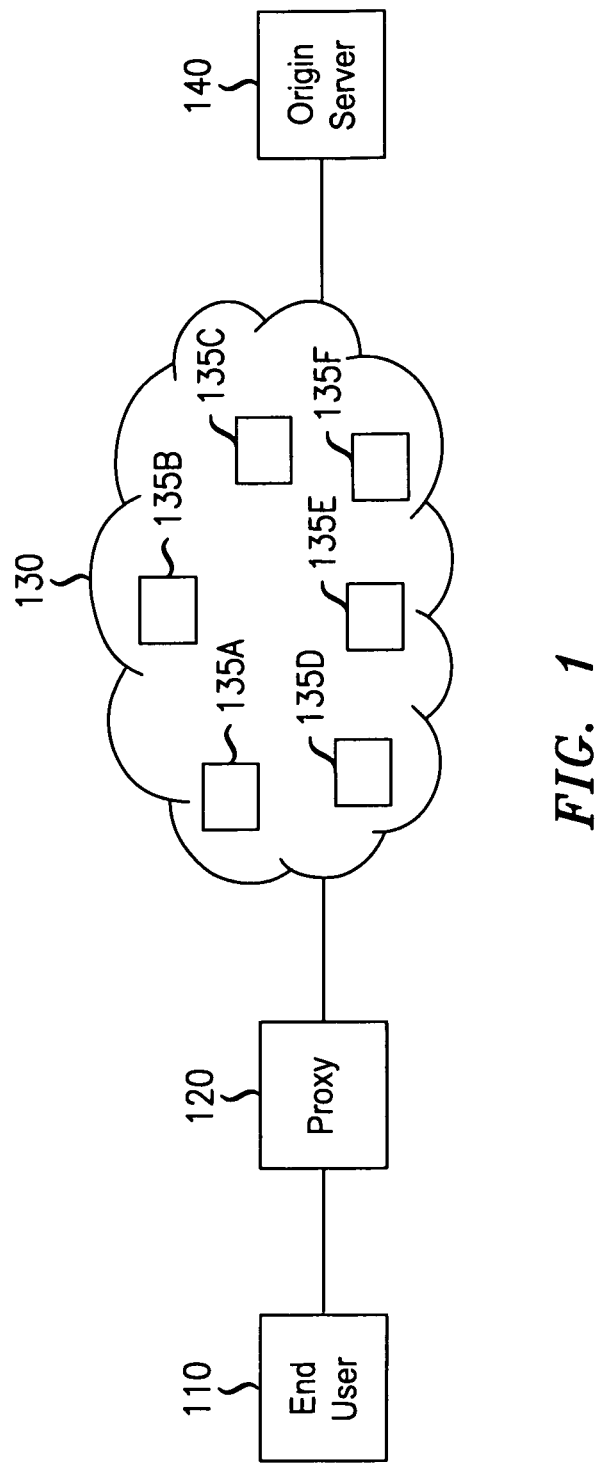
FIG. 1 is a diagram illustrating a portion of a data network in accordance with an embodiment of the present invention.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 illustrates a portion of a communications network 100. Communications network 100 includes an end user 110, a proxy 120, a group of routers 130 and an origin server 140.

The end user 110 may be embodied by, for example, a personal computer running a internet browser. The end user 110 is connected to the proxy 120. The proxy 120 may be embodied by, for example, a stand alone machine including a personal computer or a server. The proxy is capable of processing content requests generated by the end-user. The proxy is capable of performing DNS resolution for the content requests received from the end user. The content requested may be, for example, URLs or web pages, audio objects, video objects, text objects or any other type of data. As used herein, the term 'content' is interchangeable with the term 'data'. The proxy 120 is capable of generating modified TCP and/or UDP messages based on the content requests received from the end user 110. The operation of the proxy 120 will be discussed further below.

Though the proxy 120 is illustrated as being separate from the end user 110, according to an example embodiment of the present invention, the proxy 120 may also be a program running within a computer embodying the end user 110. Further, the functionality of the proxy 120 may also be implemented by an operating system being used by the end user 110 where the operating system is configured to perform the functions of the proxy 120 including, for example, performing DNS resolution and generating modified TCP and/or UDP messages.

The proxy 120 is capable of communicating with the internet via routers 130. Routers 130 provide a connection between the proxy 120 and the origin server 140. Routers 130 include caching routers 135A~F. Caching routers 135A~F are routers which include storage space capable of storing content. Caching routers 135A~F are also capable of processing the modified TCP and/or UDP messages generated by the proxy 120. Though routers 130 are illustrated as only including six caching routers 135A~F, routers 130 may include any number of caching routers. Further, though routers 130 are illustrated as including only caching routers 135A~F, routers 130 may also include any number of conventional routers.

According to some embodiments of the present invention, groups of caching routers may be deployed in caching router groups or 'clouds' within groups of conventional routers. Caching routers that are physically located on the outer edges of these caching router clouds may be designated as border caching routers. For example, a caching router according to some embodiments of the present invention may store a value indicating whether or not the caching router is a border router. This value may be changed, for example, directly or remotely by a network operator. The operation of caching routers 135A~F will be discussed in greater detail below.

The origin server 140 is a server that provides content in response to content requests. For example, the origin server 140 may store content for a particular website. In this case, the origin server 140 may receive content requests associated with the particular website and the origin server 140 may respond to the requests by providing the requested content. Though, for the purpose of simplicity, only one origin server 140 is illustrated, data network 100 may include any number of origin servers. Further, though not illustrated, data network 100 may include any number of caching servers associated with each of the origin servers in data network 100. The caching servers may cache content stored in the origin servers.

Three different embodiments of methods for handling on-path content distribution will now be discussed with reference to data network 100 illustrated in FIG. 1. In each of the examples provided below, it is assumed that the end user 110 makes a content request for content stored on the origin server 140.

For the purpose of simplicity, the proxy 120 will be discussed with reference to the proxy being separate from the end user 110 as is illustrated in FIG. 1. However, according to example embodiments of the present invention, all the functions of the proxy 120 discussed herein may also be performed by a proxy running as a program on the same computer as end user 110, or by an operating system of the end user 110 implementing the functionality of the proxy 120 with the exception that establishing a TCP connection with the end user 110 may not be necessary.

First Embodiment

The first embodiment employs modified TCP connection request messages including content identifiers to facilitate on-path content distribution. The first embodiment will be discussed with reference to FIGS. 1, 2, 3 and 4.

Figure 2:
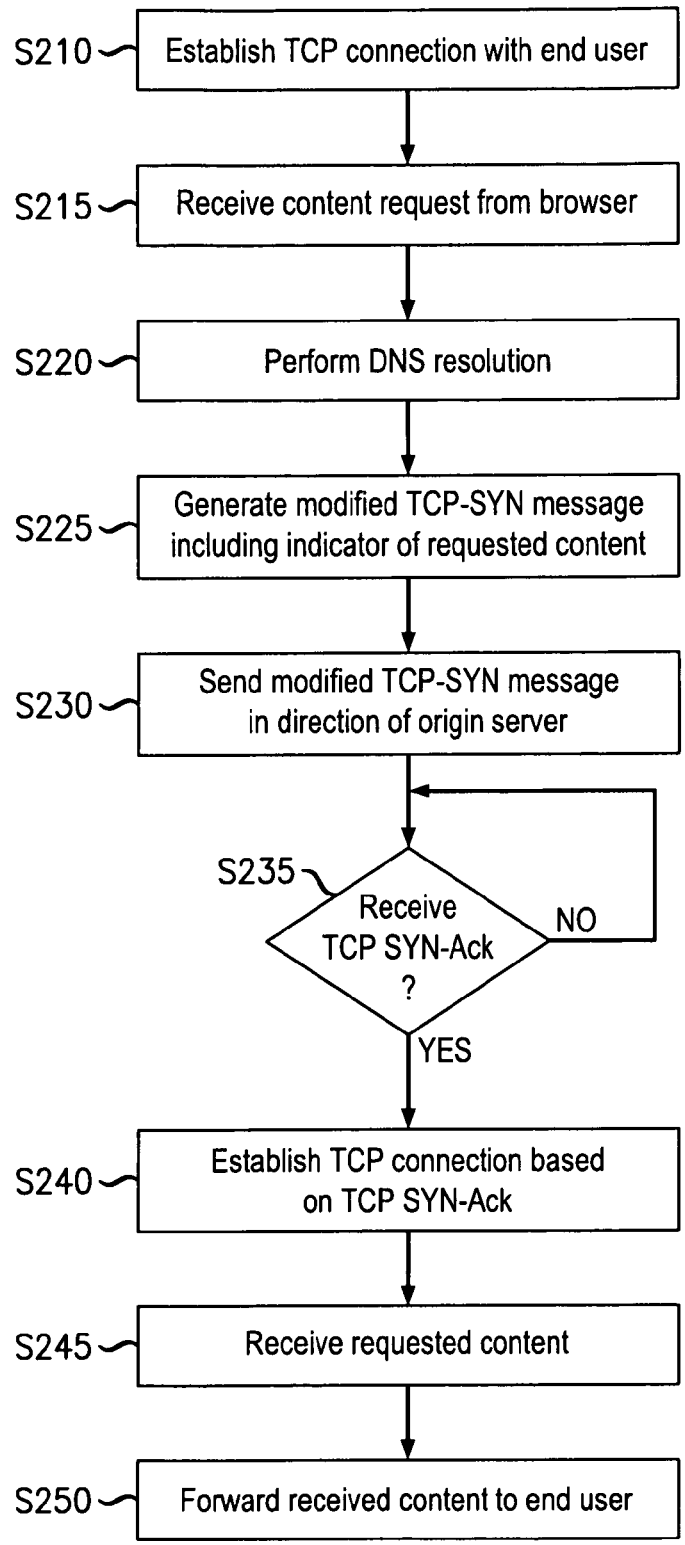
FIG. 2 is a flow chart illustrating a method of handling a request for content from a network in accordance with an embodiment of the present invention.

FIG. 2 is a flow chart illustrating a method of handling a request for content from a network in accordance with an embodiment of the present invention. The method illustrated in FIG. 2 will be explained from the view point of the proxy 120 as an example.

In step S210, the end user 110 establishes a TCP connection with the proxy 120.

In step S215, the proxy 120 receives a content request from the end user 110. The content request may be, for example, a URL request.

In step S220, the proxy 120 performs a DNS resolution and obtains an IP address associated with the content requested by the end user 110.

In step S225, the proxy 120 generates a modified TCP connection request message, for example a modified TCP SYN message. The modified TCP connection request message includes a content identifier associated with the content requested by the content request received from the end user 110 in step S215. For example, if the requested content is a webpage, the proxy 120 may insert a text string of a requested URL or a hash value of the same in the modified TCP SYN message as the content identifier. The modified TCP connection request message may be a standards-compliant TCP SYN message including, for example, a URL in the payload.

A conventional router will not process the URL in the payload of the TCP SYN message. However a caching router, according to embodiments of the present invention, can process the URL in the payload of the TCP SYN message as will be discussed in greater detail with reference to FIG. 3.

In step S230, the proxy 120 uses the IP address obtained in step S220 and sends the modified TCP connection request message generated in step S225 in the direction of the origin server 140 via routers 130.

In step S235, the proxy 120 waits for a TCP connection grant message, for example a TCP SYN-ACK message. Once a TCP connection grant message is received, the proxy 120 proceeds to step S240. The TCP connection grant message may be received from, for example, one of the caching routers 135A~F or the origin server 140.

In step S240, the proxy 120 sends a TCP acknowledgment message, for example a TCP ACK message, and establishes a TCP connection with the device that responded to the TCP connection request sent from the proxy 120 in step S230 by sending the TCP connection grant message received by the proxy 120 in step S235. For example, if the TCP connection grant message is received from caching router 135A, the proxy 120 sends a TCP acknowledgement message to caching router 135A thus completing a three-way handshake process and establishing a TCP connection with caching router 135A. As another example, if the TCP connection grant message is received from the origin server 140, the proxy 120 sends a TCP acknowledgement message to the origin server 140 thus completing a three-way handshake process and establishing a TCP connection with the origin server 140.

In step S245, the proxy 120 receives the content requested in the content request received by the proxy 120 from the end user 110 in step S215 via the TCP connection established in step S240.

In step S250, the proxy 120 forwards the content received in step S245 to the end user 110 via the TCP connection established in step S210. The proxy 120 does not have to wait for all of the content to be received before he proxy 120 begins forwarding the content. The proxy 120 may begin forwarding the content after a sufficient amount of data has been received according to any well known process for forwarding data using a TCP connection.

According to the first embodiment, the proxy 120 is capable of providing a modified TCP connection request message including a novel content identifier which can be processed by a caching router for the purpose of facilitating on-path content distribution as will be discussed in greater detail below.

Figure 3:
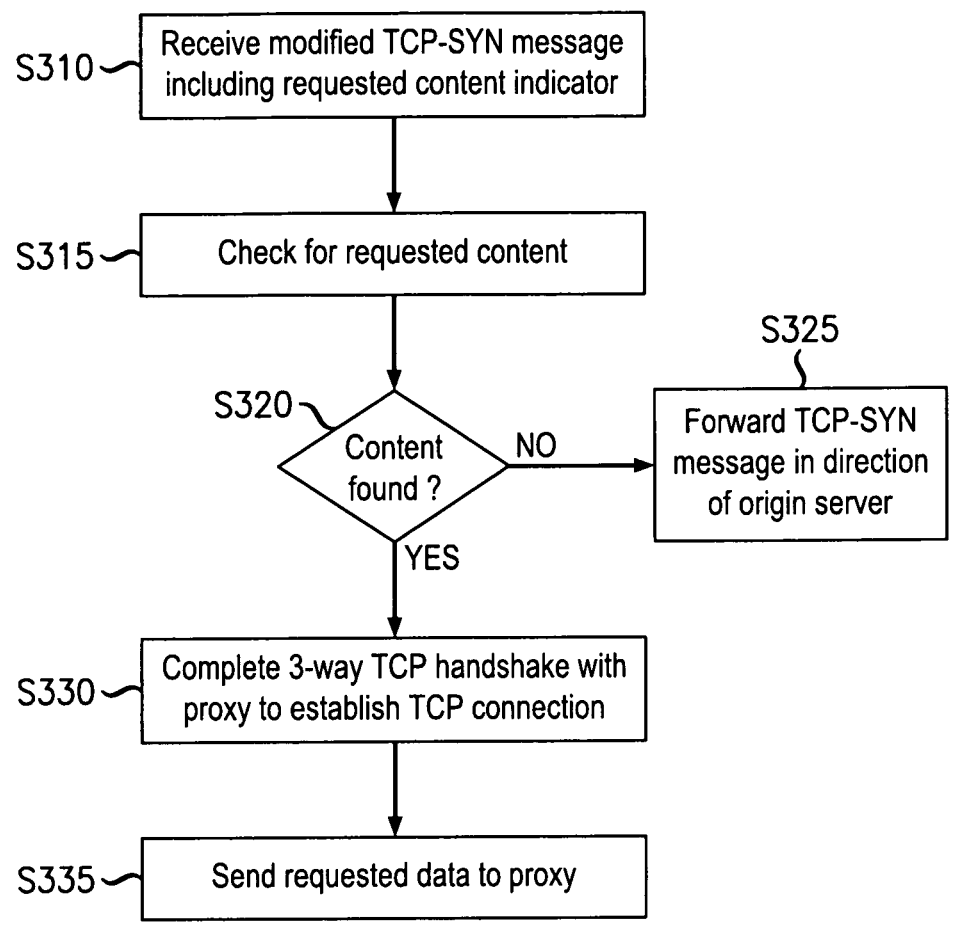
FIG. 3 is a flow chart illustrating a method of providing content requested from a network in accordance with an embodiment of the present invention.

FIG. 3 is a flow chart illustrating a method of providing content requested from a network in accordance with an embodiment of the present invention. The method illustrated in FIG. 3 will be explained from the view point of the caching router 135A as an example.

In step S310, the caching router 135A receives a modified TCP connection request message, for example a TCP-SYN message, including a content identifier. The connection request message originates from the proxy 120 and the content identifier identifies content requested by the end user 110.

In step S315, the caching router 135A checks the content identifier, then checks the content stored at the caching router 135A and proceeds to step S320.

In step S320, the caching router 135A determines whether or not the caching router 135A contains the content identified by the content identifier.

If, in step S320, the caching router 135A determines the identified content is not stored at the caching router 135A, the caching router 135A proceeds to step S325.

In step S325, the caching router 135A forwards the TCP connection request message received in step S310 in the direction of the origin server 140 based on destination information included in the TCP connection request message.

If, in step S320, the caching router 135A determines the identified content is stored at the caching router 135A, the caching router 135A proceeds to step S330.

In step S330, the caching router 135A completes a three way hand shake operation and establishes a TCP connection with the proxy 120. The caching router 135A responds to the TCP connection request message sent from the proxy 120 with a TCP connection grant message sent to the proxy 120. The router 135A then receives a TCP acknowledgement message from the proxy 120 completing the three-way handshake process and establishing the TCP connection.

In step S335, the caching router 135A sends the content identified by the content identifier to the proxy via the TCP connection established in step S330.

According to the first embodiment of the present invention, the caching router 135A is capable of processing a modified TCP connection request message, including a content identifier, for the purpose of performing the novel operation of checking whether the requested content is stored at the caching router, and, when the requested content is found, serving the requested content directly from the caching router to provide on-path content distribution.

Though the method illustrated in FIG. 3 is discussed with reference to caching router 135A, the method illustrated in FIG. 3 can be applied to any caching router, for example caching routers 135B-E.

Figure 4:
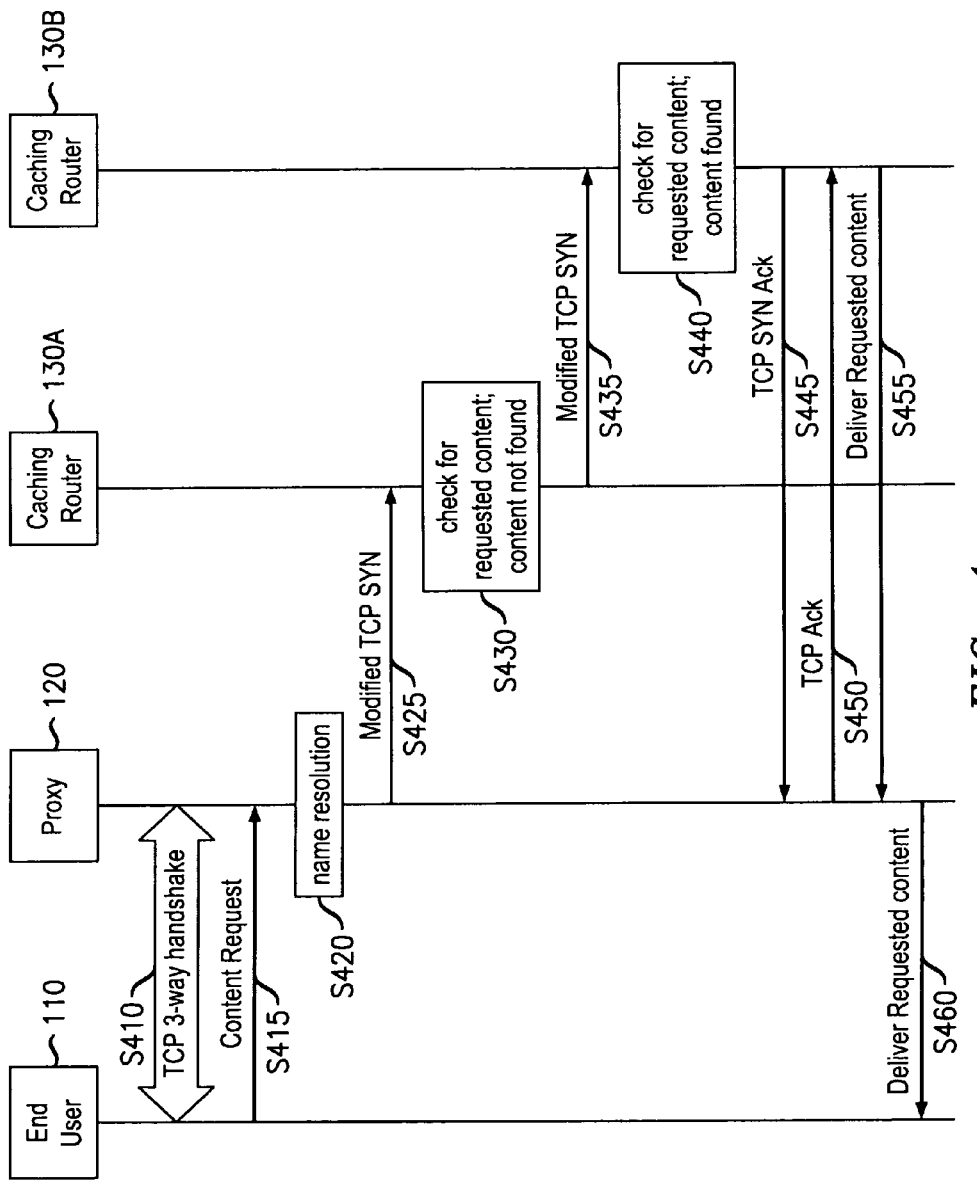
FIG. 4 is a communications flow diagram illustrating a method of providing on-path content distribution in accordance with an embodiment of the present invention.

FIG. 4 is a communications flow diagram illustrating a method of providing on-path content distribution in accordance with an embodiment of the present invention. FIG. 4 illustrates an example operation of the data network 100 according to a first embodiment of the present invention.

The example illustrated in FIG. 4 will be explained with reference to the end user 110, the proxy 120, caching router 130A and caching router 130B. In the example provided below, it is assumed that end user 110 makes a content request, the caching router 130A does not contain the content requested by the end user 110, and the caching router 130B does contain the content requited by the end user 110.

Referring to FIG. 4, in step S410, a TCP connection is established between the end user 110 and the proxy 120.

In step S415, the end user 110 sends a URL request to the Proxy 120.

In step S420, the proxy 120 performs a name resolution to obtain an IP address associated with the URL requested by the end user in step S415.

In step S425, the proxy 120 send a modified TCP SYN message towards the origin router 140. The modified TCP SYN message includes a content identifier identifying URL requested by the end user in step S415.

In step S430, the caching router 130A receives the modified TCP SYN message sent by the proxy 120 and determines that the content associated with the identified URL is not stored at the router 130A.

In step S435, the caching router 130A forwards the modified TCP SYN message received in step S425 in the direction of the origin server 140.

In step S440, the caching router 130B receives the modified TCP SYN message sent by the proxy 120 and determines that the content associated with the identified URL is stored at the router 130B.

In step S445, the caching router 130B sends a TCP SYN ACK message to the proxy 120 indicating that the caching router 130B has the content associated with the requested URL.

In step S450, in response to the TCP SYN ACK message sent by the router 130B in step S445, the proxy 120 sends a TCP ACK message to the caching router 130B completing a three way handshake process and establishing a TCP connection between the proxy 120 and the caching router 130B.

In step S455, the caching router 130B delivers the content associated with the requested URL to the proxy 120 via the TCP connection between the proxy 120 and the caching router 130B.

In step S460, the proxy 120 delivers the content associated with the requested URL to the end user 110 via the TCP connection between the end user 110 and the proxy 120 established in step S410. As is discussed above with reference to step S250 in FIG. 2, the proxy 120 can deliver the content associated with the requested URL to the end user 110 as soon as a sufficient amount of the content is received.

Thus, according to the first embodiment of the present invention, the content requested by the end user 110 can be provided by an on-path node, the router 130B, within the path between the end user 110 and the origin server 140 with the use of a proxy for generating a modified TCP connection request message, and a caching router for storing content and responding to the modified TCP connection request message.

Though the scenario illustrated in FIG. 4 illustrates a particular sequence of messages, the scenario illustrated in FIG. 4 is provided only as an example and any number of different message sequences may occur in accordance with the first embodiment of the present invention.

Second Embodiment

The second embodiment employs UDP messages including content identifiers to facilitate on-path content distribution. According to the second embodiment of the present invention, one or more caching routers in data network 100, for example caching routers 135A~F, may be designated as border caching routers. As was discussed previously with reference to FIG. 1, border caching routers may be caching routers that are physically located on the outer edges of caching router groups or 'clouds'. The second embodiment will be discussed with reference to FIGS. 1, 5, 6 and 7.

Figure 5:
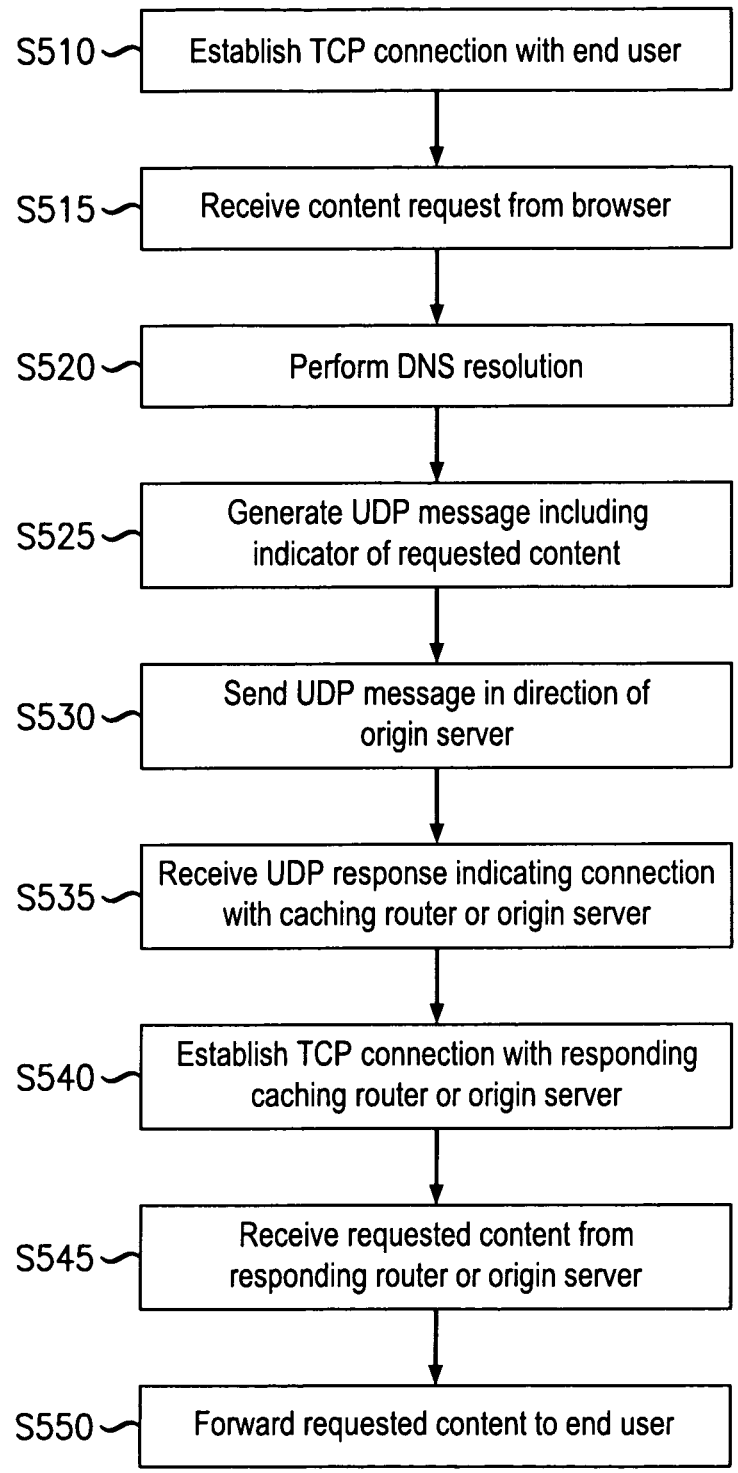
FIG. 5 is a flow chart illustrating a method of handling a request for content from a network in accordance with another embodiment of the present invention.

FIG. 5 is a flow chart illustrating a method of handling a request for content from a network in accordance with another embodiment of the present invention. The method illustrated in FIG. 5 will be explained from the view point of the proxy 120 as an example.

In step S510, the end user 110 establishes a TCP connection with the proxy 120.

In step S515, the proxy 120 receives a content request from the end user 110. The content request may be, for example, a URL request.

In step S520, the proxy 120 performs a DNS resolution and obtains an IP address associated with the content requested by the end user 110.

In step S525, the proxy 120 generates a UDP message including a content identifier associated with the content requested by the content request received from the end user 110 in step S515. The content identifier used in step S525 may be the same as the content identifier discussed in step S225.

In step S530, the proxy 120 sends the UDP message including the content identifier in the direction of the origin server 140 using the IP address obtained in step S520.

According to the second embodiment of the present invention, the proxy 120 may receive one of two responses to the UDP message sent in step S530.

The proxy 120 can receive a UDP response from a caching router, for example caching routers 135A~F, indicating the proxy 120 to establish a TCP connection with the responding caching router, or the proxy 120 may receive a UDP response from a caching router, for example caching routers 135A~F, including an indication for the proxy to attempt to establish a TCP connection with the origin server 140.

In step S535, the proxy 120 receives a UDP response indicating the proxy 120 to establish a TCP connection with a caching router or a UDP response indicating the proxy 120 to establish a TCP connection with the origin server 140 and proceeds to step S545.

Further, according to some embodiments, the proxy 120 may implement a timeout process in step S535. Accordingly, in the event no UDP response is received, after a timeout period elapses, the proxy 120 may either return to step S530 and resend the UDP message, or the proxy 120 may establish a connection with the origin server 140 and skip to step S545.

In step S540, the proxy 120 establishes a TCP connection with the responding caching router or the origin server based on the UDP response received in step S535.

In step S545, the proxy 120 receives the requested content from the responding caching router or the origin server 140 via the TCP connection established in step S540, based on the UDP response received in step S535, and proceeds to step S560.

In step S550, the proxy 120 forwards the requested data to the end user 110. The proxy 120 does not have to wait for all of the content to be received before he proxy 120 begins forwarding the content. The proxy 120 may begin forwarding the content after a sufficient amount of data has been received according to any well known process for forwarding data using a TCP connection.

According to the second embodiment, the proxy 120 is capable of providing a UDP message including a novel content identifier which can be processed by a caching router for the purpose of facilitating on-path content distribution as will be discussed in greater detail below.

Figure 6:
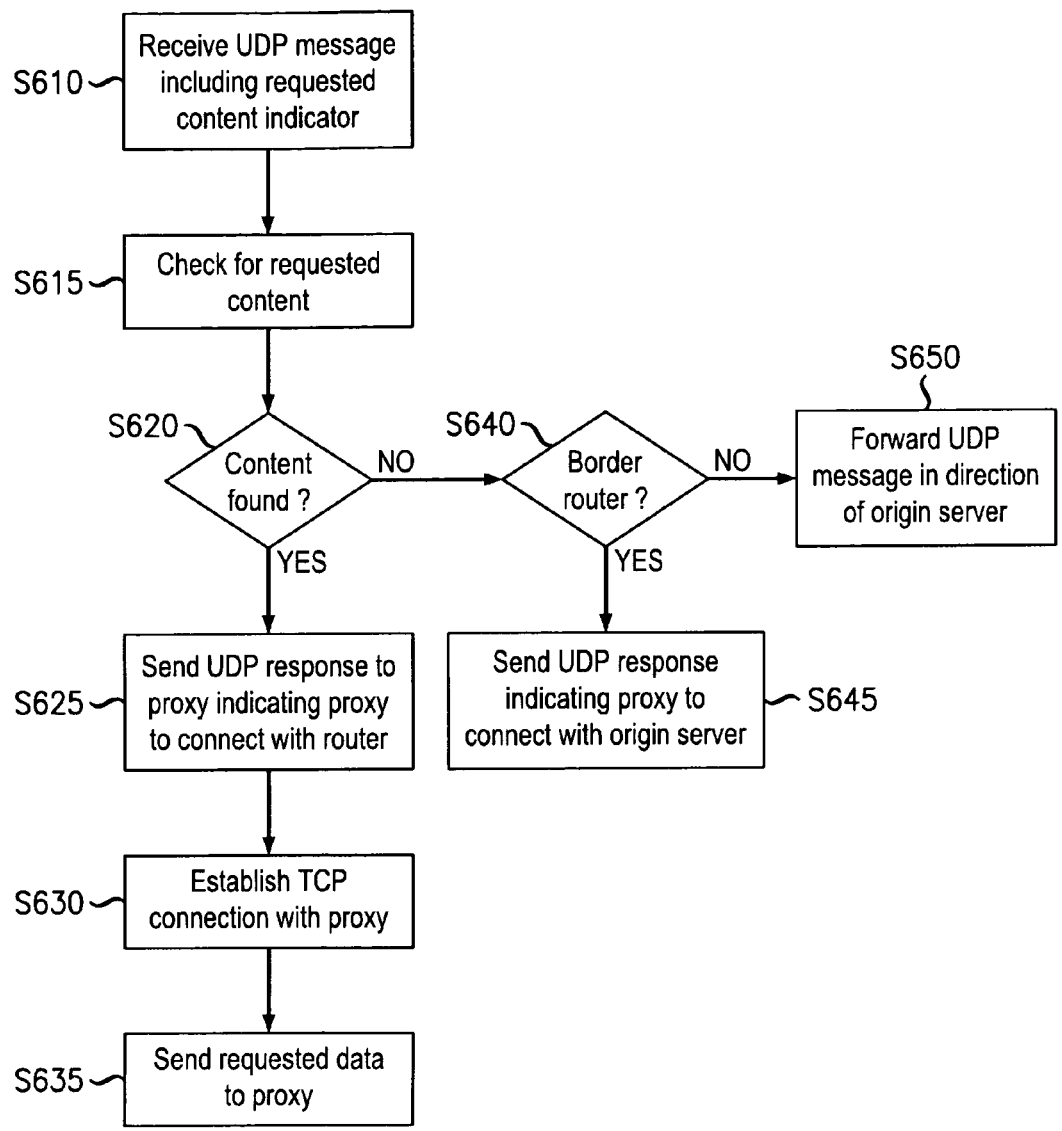
FIG. 6 is a flow chart illustrating a method of providing content requested from a network in accordance with another embodiment of the present invention.

FIG. 6 is a flow chart illustrating a method of providing content requested from a network in accordance with an embodiment of the present invention. The method illustrated in FIG. 6 will be explained from the view point of the caching router 135A as an example.

In step S610, the caching router 135A receives a UDP message including a content identifier. The UDP message originates from the proxy 120 and the content identifier identifies content requested by the end user 110.

In step S615, the caching router 135A checks the content identifier, then checks the content stored at the caching router 135A and proceeds to step S620.

In step S620, the caching router 135A determines whether or not the caching router 135A contains the requested content identified by the content identifier. If, in step S620, the caching router 135A determines the caching router 135A contains the requested content, the caching router 135A proceeds to step S625.

In step S625, the caching router 135A sends a UDP response to the proxy 120 indicating the proxy 120 to establish a TCP connection with the caching router 135A.

In step S630, a TCP connection is established between the proxy 120 and the caching router 135A using, for example, a three-way handshake process.

In step S635, the caching router 135A sends the requested content to the proxy 120 via the TCP connection established in step S630.

If, in step S620, the caching router 135A determines the caching router 135A does not contain the requested content, the caching router 135A proceeds to step S640.

In step S640, the caching router 135A determines whether or not the caching router 135A is designated as a border router.

If, in step S640, the caching router 135A determines the caching router 135A is designated as a border caching router, the caching router 135A proceeds to step S645.

In step S645, the caching router 135A sends a UDP response to the proxy 120 indicating the proxy 120 to attempt to establish a TCP connection with the origin server.

If, in step S640, the caching router 135A determines the caching router 135A is not designated as a border caching router, the caching router 135A proceeds to step S650.

In step S650, the caching router 135A forwards the UDP message received in step S610 in the direction of the origin server 140 using address information in the UDP message.

According to the second embodiment, the caching router 135A is capable of processing a UDP message, including a content identifier, for the purpose of performing the novel operation of checking whether the requested content is stored at the caching router, and, when the requested content is found, serving the requested content directly from the caching router to provide on-path content distribution.

Though the method illustrated in FIG. 6 is discussed with reference to caching router 135A, the method illustrated in FIG. 6 can be applied to any caching router, for example caching routers 135B-E.

Figure 7:
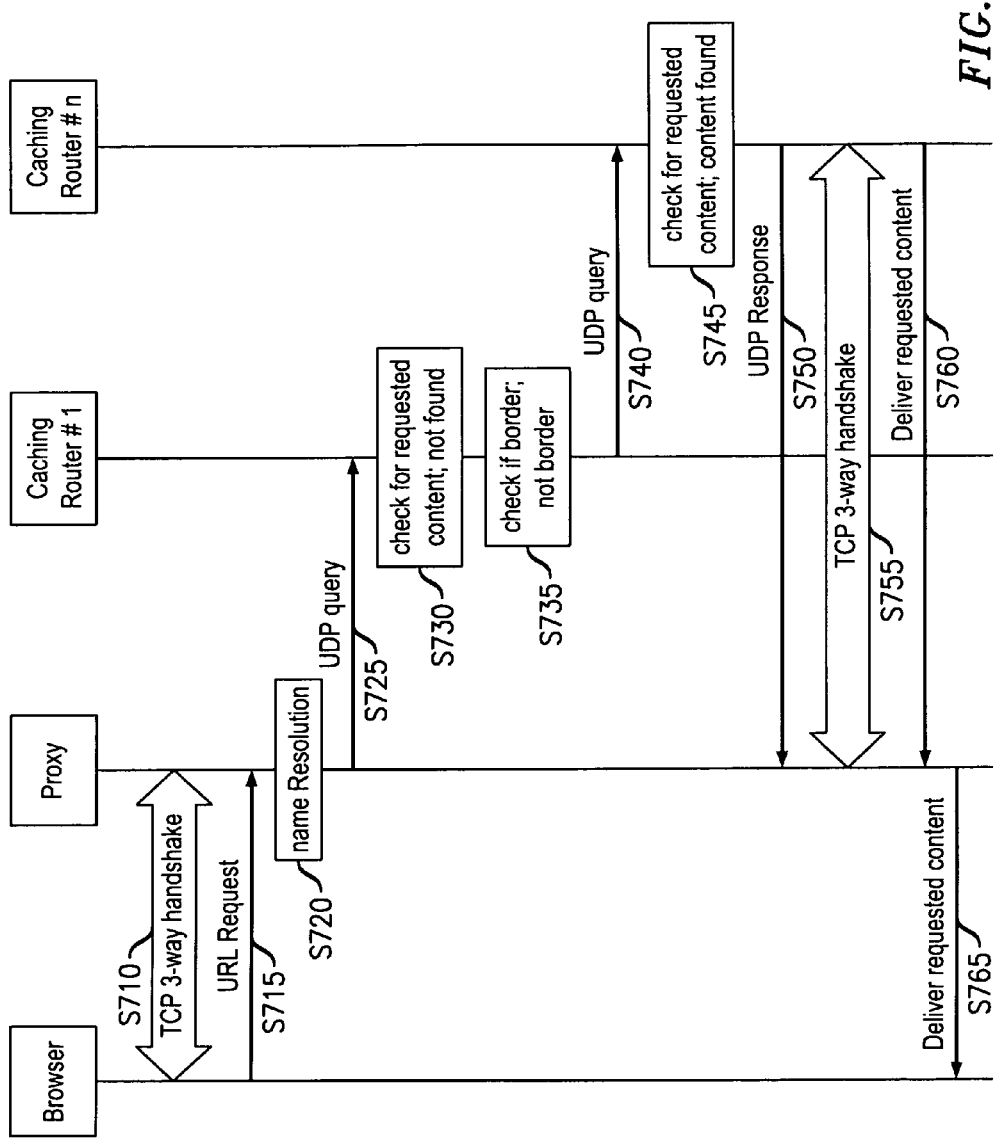
FIG. 7 is a communications flow diagram illustrating a method of providing on-path content distribution in accordance with an embodiment of the present invention.

FIG. 7 is a communications flow diagram illustrating a method of providing on-path content distribution in accordance with an embodiment of the present invention. FIG. 7 illustrates an example operation of the data network 100 according to a second embodiment of the present invention.

The example illustrated in FIG. 7 will be explained with reference to the end user 110, the proxy 120, caching router 130A and caching router 130B. In the example provided below, it is assumed that end user 110 makes a content request, the caching router 130A does not contain the content requested by the end user 110, and the caching router 130B does contain the content requited by the end user 110. Further, it is assumed that neither the caching router 130A nor the caching router 130B are designated as border routers.

Referring to FIG. 7, in step S710, a TCP connection is established between the end user 110 and the proxy 120.

In step S715, the end user 110 sends a URL request to the Proxy 120.

In step S720, the proxy 120 performs a name resolution to obtain an IP address associated with the URL requested by the end user in step S715.

In step S725, the proxy 120 sends a UDP message towards the origin router 140. The UDP message includes a content identifier identifying the URL requested by the end user in step S415.

In step S730, the caching router 130A receives the UDP message sent by the proxy 120 and determines that the content associated with the identified URL is not stored at the router 130A.

In step S735, the caching router 135A determines that the caching router 135A is not designated as a border router.

In step S740, the caching router 135A sends the UDP message towards the origins server 140.

In step S745, the caching router 130B receives the UDP message sent by the proxy 120 and determines that the content associated with the identified URL is stored at the router 130B.

In step S750, the caching router 130B sends a UDP response message to the proxy 120 indicating that the caching router 130B has the content associated with the requested URL.

In step S755, in response to receiving the UDP response from the caching router 130B indicating that the caching router 130B has the content associated with the requested URL, the proxy 120 establishes a TCP connection with the caching router 130B using, for example, a three-way handshake process.

In step S760, the caching router 130B delivers the content associated with the requested URL to the proxy 120 via the TCP connection between the proxy 120 and the caching router 130B established in step S755.

In step S765, the proxy 120 delivers the content associated with the requested URL to the end user 110 via the TCP connection between the end user 110 and the proxy 120 established in step S710.

Thus, according to the second embodiment of the present invention, the content requested by the end user 110 can be provided by an on path node, the router 130B, within the path between the end user and the origin server 140 with the use of a proxy for generating UDP messages including content identifiers and a caching router, for storing content, responding to the UDP messages.

Further, according to the second embodiment of the present invention, caching routers may be designated as border routers. Accordingly, if the proxy 120 provides a UDP message including a content identifier identifying requested content, and no caching routers in network 100 send a UDP response indicating possession of the requested content, a border router will still generate a UDP response indicating the proxy 120 to attempt to establish a TCP connection with the origins server 140. Thus, even if no caching routers in network 100 contain the requested content, a UDP response message will still be sent to the proxy 120 to prevent the proxy 120 from waiting indefinitely for a UDP response before attempting to obtain the requested content from the origin server.

Though the scenario illustrated in FIG. 7 illustrates a particular sequence of messages, the scenario illustrated in FIG. 7 is provided only as an example and any number of different message sequences may occur in accordance with the first embodiment of the present invention.

Third Embodiment

The third embodiment employs TCP connection request messages sent along with UDP messages including content identifiers to facilitate on-path content distribution. The third embodiment will be discussed with reference to FIGS. 1, 8, 9 and 10.

Figure 8:
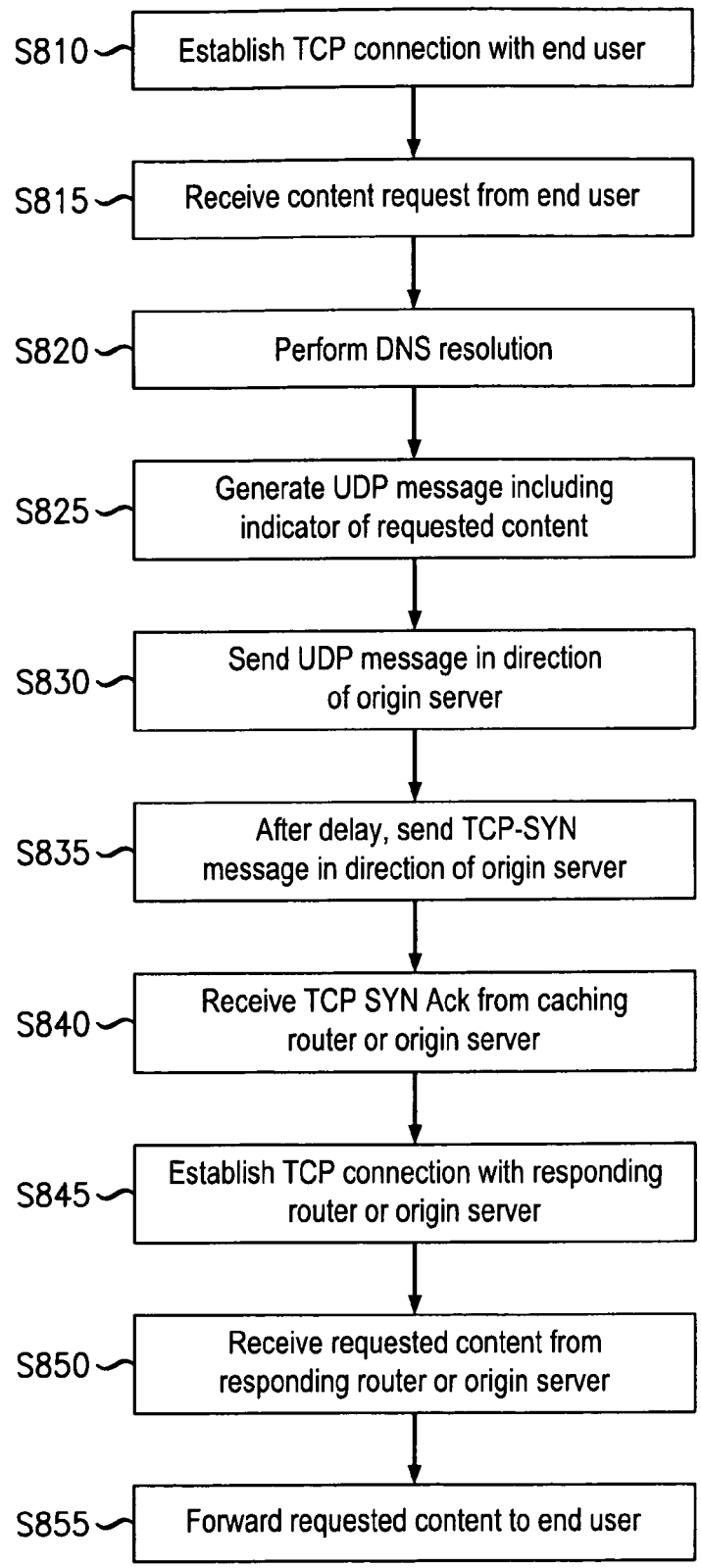
FIG. 8 is a flow chart illustrating a method of handling a request for content from a network in accordance with yet another embodiment of the present invention.

FIG. 8 is a flow chart illustrating a method of handling a request for content from a network in accordance with an embodiment of the present invention. The method illustrated in FIG. 8 will be explained from the view point of the proxy 120 as an example.

In step S810, the end user 110 establishes a TCP connection with the proxy 120.

In step S815, the proxy 120 receives a content request from the end user 110. The content request may be, for example, a URL request.

In step S820, the proxy 120 performs a DNS resolution and obtains an IP address associated with the content requested by the end user 110.

In step S825, the proxy 120 generates a UDP message including a content identifier associated with the content requested by the content request received from the end user 110 in step S815. The content identifier used in step S825 may be the same as the content identifier discussed in step S225.

In step S830, the proxy 120 uses the IP address obtained in step S820 and sends the UDP message generated in step S825 in the direction of the origin server 140 via routers 130.

In step S835, the proxy 120 sends a TCP connection request message, for example a TCP SYN message, in the direction of the origin server 140. The proxy 120 may send the TCP connection request after a short delay from time when UDP message is sent in step S830, for example 10 ms.

According to the third embodiment of the present invention, the proxy 120 may receive one of two responses to the UDP message sent in step S830 and the TCP connection request message sent in step S835.

The proxy 120 can receive a TCP connection grant message from a caching router, for example caching routers 135A~F, indicating the proxy 120 to establish a TCP connection with the responding caching router, or the proxy 120 can receive a TCP connection grant message from the origin server 140 indicating the proxy 120 to establish a TCP connection with the origin server 140.

In step S840, the proxy 120 receives a TCP connection grant message from a caching router, for example caching routers 135A~F, responding to the UDP message sent in step S830, or the proxy 120 receives a TCP connection grant message from the origin server 140 in response to the TCP connection request sent in step S835.

Further, according to some embodiments, the proxy 120 may implement a timeout process in step S840. Accordingly, in the event no TCP connection grant message is received, after a timeout period elapses, the proxy 120 may either return to steps S830 and S835 and resend the UDP message and TCP connection request messages.

In step S845, the proxy 120 establishes a TCP connection based on the TCP connection grant message received in step S840. If the TCP connection grant message received in step S840 is received from a caching router, the proxy 120 establishes a TCP connection with the responding caching router using, for example, a three-way handshake process. If the TCP connection grant message received in step S840 is received from the origin server 140, the proxy 120 establishes a TCP connection with the origin server 140, using, for example, a three-way handshake process.

In step S850, the proxy 120 receives the requested content from the responding caching router or the origin server 140 and proceeds to step S855.

In step S855, the proxy 120 forwards the requested data to the end user 110. The proxy 120 does not have to wait for all of the content to be received before he proxy 120 begins forwarding the content. The proxy 120 may begin forwarding the content after a sufficient amount of data has been received according to any well known process for forwarding data using a TCP connection.

According to the third embodiment, the proxy 120 is capable of providing a UDP message including a novel content identifier which can be processed by a caching router for the purpose of facilitating on-path content distribution as will be discussed in greater detail below.

Figure 9:
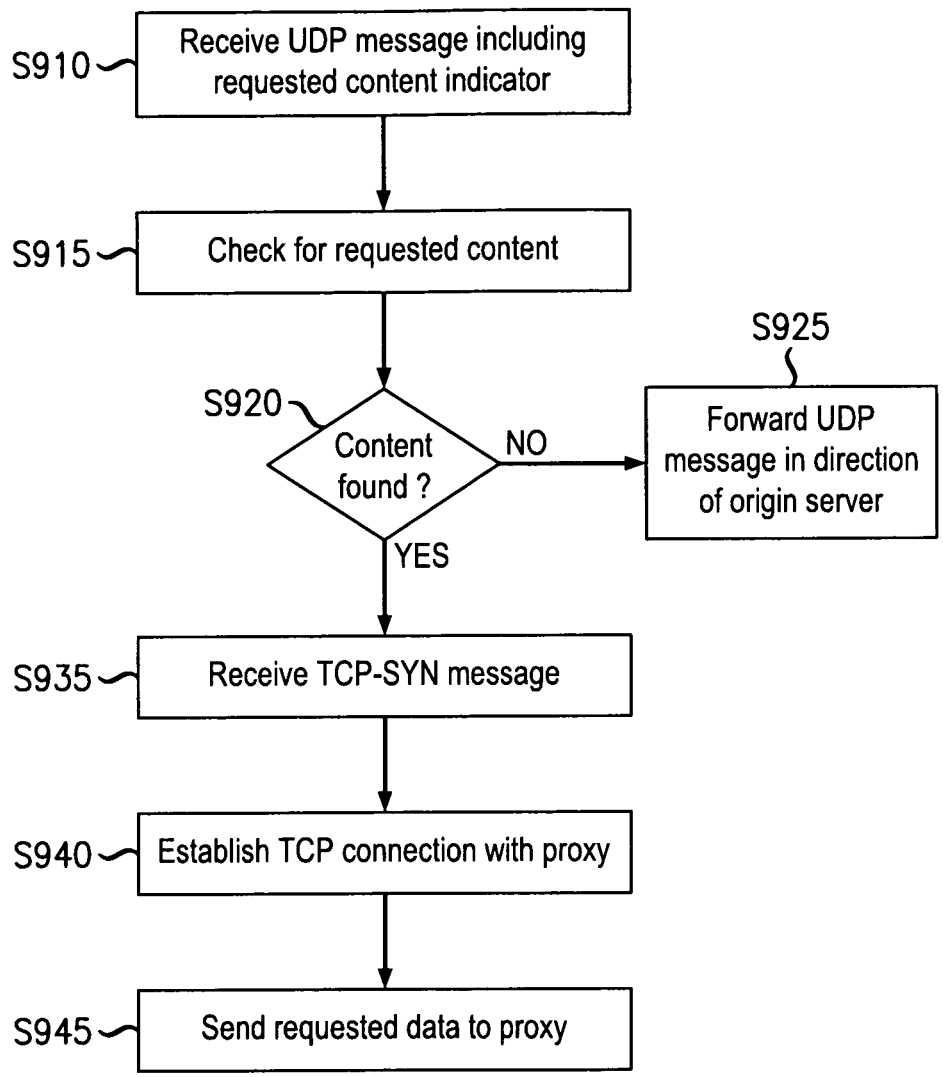
FIG. 9 is a flow chart illustrating a method of providing content requested from a network in accordance with yet another embodiment of the present invention.

FIG. 9 is a flow chart illustrating a method of providing content requested from a network in accordance with an embodiment of the present invention. The method illustrated in FIG. 9 will be explained from the view point of the caching router 135A as an example.

In step S910, the caching router 135A receives a UDP message including a content identifier. The UDP message originates from the proxy 120 and the content identifier identifies content requested by the end user 110.

In step S915, the caching router 135A checks the content identifier, then checks the content stored at the caching router 135A and proceeds to step S920.

In step S920, the caching router 135A determines whether or not the caching router 135A contains the requested content identified by the content identifier.

If, in step S920, the caching router 135A determines the requested content is not stored at the caching router 135A, the caching router 135A proceeds to step S925.

In step S925, the caching router 135A forwards the UDP message received in step S910 in the direction of the origin server 140.

If, in step S920, the caching router 135A determines the requested content is stored at the caching router 135A, the caching router 135A proceeds to step S935.

In step S935, the caching router 135A receives a TCP connection request message, for example a TCP SYN, originating from the proxy 120.

In step S940, the caching router 135A establishes a TCP connection with the proxy 120 using, for example, a three-way handshake process.

In step S945, the caching router 135A sends the requested content to the proxy 120 via the TCP connection established between the proxy 120 and the router 135A in step S940.

According to the third embodiment, the caching router 135A is capable of processing a UDP message, including a content identifier, for the purpose of performing the novel operation of checking whether the requested content is stored at the caching router, and, when the requested content is found, serving the requested content directly from the caching router to provide on-path content distribution.

Though the method illustrated in FIG. 9 is discussed with reference to caching router 135A, the method illustrated in FIG. 9 can be applied to any caching router, for example caching routers 135B-E.

Figure 10:
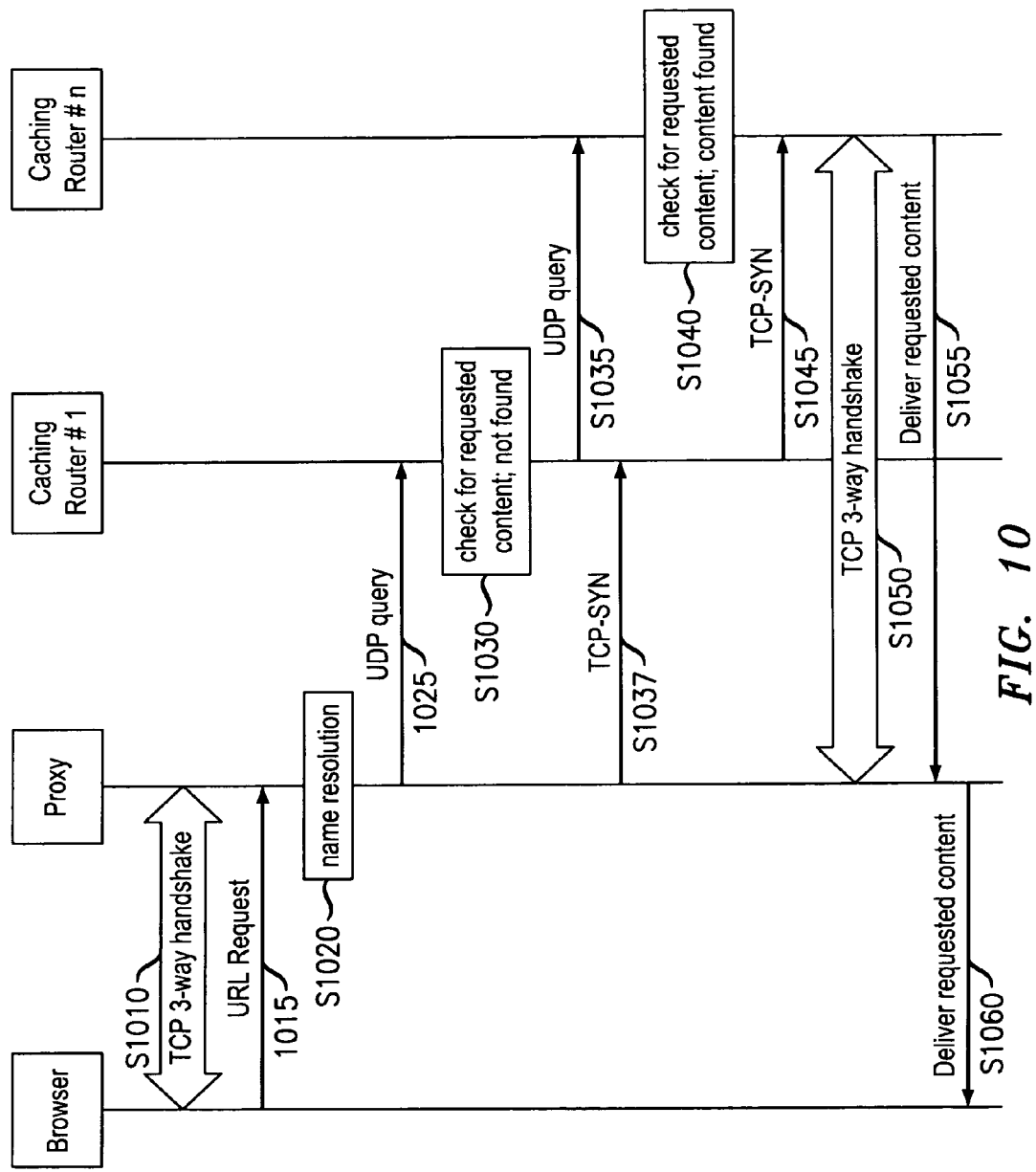
FIG. 10 is a communications flow diagram illustrating a method of providing on-path content distribution in accordance with an embodiment of the present invention.

FIG. 10 is a communications flow diagram illustrating a method of providing on-path content distribution in accordance with an embodiment of the present invention. FIG. 10 illustrates an example operation of the data network 100 according to a third embodiment of the present invention. The example illustrated in FIG. 10 will be explained with reference to the end user 110, the proxy 120, caching router 130A and caching router 130B. In the example provided below, it is assumed that end user 110 makes a content request, the caching router 130A does not contain the content requested by the end user 110, and the caching router 130B does contain the content requested by the end user 110.

Referring to FIG. 10, in step S1010, a TCP connection is established between the end user 110 and the proxy 120.

In step S1015, the end user 110 sends a URL request to the Proxy 120.

In step S1020, the proxy 120 performs a name resolution to obtain an IP address associated with the URL requested by the end user in step S1015.

In step S1025, the proxy 120 sends a UDP message towards the origin router 140. The UDP message includes a content identifier identifying the URL requested by the end user in step S1015.

In step S1030, the caching router 130A receives the UDP message sent by the proxy 120 and determines that the content associated with the identified URL is not stored at the router 130A.

In step S1035, the caching router 130A sends the UDP message received in step S1030 in the direction of the origin server 140.

In step S1037, after a delay with respect to sending the UDP message in step S1025, the proxy 120 sends a TCP SYN message towards the origin server 140.

In step S1040, the caching router 130B receives the UDP message and determines that the router 130B does contain the requested content indentified by the content identifier included in the UDP message.

In step S1045, the caching router 130B intercepts the TCP SYN message sent by the proxy in step S1037.

In step S1050, the caching router 130B responds to the TCP SYN message received in step S1045 and establishes a TCP connection with the proxy 120 using, for example, a three-way handshake process.

In step S1055, the caching router 130B delivers the content associated with the requested URL to the proxy 120 via the TCP connection between the proxy 120 and the caching router 130B established in step S1050.

In step S1060, the proxy 120 delivers the content associated with the requested URL to the end user 110 via the TCP connection between the end user 110 and the proxy 120 established in step S1010.

Thus, according to the third embodiment of the present invention, the content requested by the end user 110 can be provided by an on path node, the router 130B, within the path between the end user and the origin server 140 with the use of a proxy for generating, in parallel, UDP messages including content identifiers and TCP connection request messages, and a caching router, for storing content, responding to the UDP messages.

Though the scenario illustrated in FIG. 10 illustrates a particular sequence of messages, the scenario illustrated in FIG. 10 is provided only as an example and any number of different message sequences may occur in accordance with the first embodiment of the present invention.

The invention being thus described, it will be obvious that the same may be varied in many ways. Such variations are not to be regarded as a departure from the invention, and all such modifications are intended to be included within the scope of the invention.

What is claimed:

1. A method of providing content requested from a network, the method comprising:
 receiving at a caching router a first UDP message originating at a proxy, the first UDP message including a content identifier, the content identifier identifying content requested by an end user;
 checking the content identifier;
 performing a first determining step of determining whether the caching router contains the requested content identified by the content identifier;
 establishing a TCP connection with the proxy if the first determining step determines the caching router contains the requested content; and
 performing a second determining step of determining whether the caching router is designated as a border router if the first determining step determines the caching router does not contain the requested content.

2. The method of claim 1, further comprising:
 forwarding the first UDP message towards a destination indicated by the first UDP message if the second determining step determines the caching router is not designated as a border router.

3. The method of claim 1, further comprising:
 sending a second UDP message to the proxy including an indication for the proxy to attempt to establish a TCP connection with the origin server if the second determining step determines the caching router is designated as a border router.

* * * * *